United States Patent [19]
Taylor et al.

[11] Patent Number: 5,510,945
[45] Date of Patent: Apr. 23, 1996

[54] POWER SUPPLY FOR GROUND FAULT CIRCUIT INTERRUPTER

[75] Inventors: Harold L. Taylor, Norcross; Jerry M. Green, Tucker, both of Ga.

[73] Assignee: Siemens Energy & Automation, Alpharetta, Ga.

[21] Appl. No.: 189,535

[22] Filed: Jan. 31, 1994

[51] Int. Cl.$^6$ ................................................ H02H 3/00
[52] U.S. Cl. ......................... 361/45; 361/18; 361/42
[58] Field of Search ............................. 361/45, 42, 18

[56] References Cited

U.S. PATENT DOCUMENTS

| | | | |
|---|---|---|---|
| 4,342,974 | 8/1982 | Nakano et al. | 335/10 |
| 4,428,019 | 1/1984 | Howell | 361/45 |
| 4,568,899 | 2/1986 | May et al. | 335/18 |
| 4,609,898 | 9/1986 | Seymour et al. | 335/202 |
| 4,641,217 | 2/1987 | Morris et al. | 361/45 |
| 5,258,732 | 11/1993 | Marquardt | 335/17 |
| 5,260,676 | 11/1993 | Patel et al. | 335/18 |

*Primary Examiner*—Jeffrey A. Gaffin
*Assistant Examiner*—Stephen Jackson

[57] ABSTRACT

A ground fault interruption circuit detects a ground condition associated with a load in an electrical distribution system and disconnects the load in response to a ground fault condition. The circuit includes a ground fault detector connected to receive a ground fault imbalance signal and operative in response to a power signal, having specified voltage and current levels, to provide a trigger signal to disconnect the load from the system when the imbalance exceeds a certain level. A regulated power supply circuit a substantially constant current and voltage signal to the detector to minimize excess power to the detector and heat loss. The power supply includes a start up and storage portion and a constant current supply portion.

13 Claims, 4 Drawing Sheets

POWER SUPPLY FOR GROUND FAULT CIRCUIT INTERRUPTER

FIELD OF THE INVENTION

This invention is directed to power supplies for ground fault circuit interrupters ("GFCI"), and particularly power supplies for two-pole ground fault circuit interrupters.

DESCRIPTION OF THE PRIOR ART

Ground fault circuit interrupters are utilized in power distribution systems to protect against personal injury and property damage which may result from ground fault-type short circuit current flow. A ground fault condition exists when there is a current imbalance between the current-carrying phases and neutral above a designated threshold specified in electrical codes. Electrical codes also mandate a maximum amount of time after power up of a ground fault circuit interrupter in which the unit must trip in response to a ground fault condition. Thus, it is desirable to power up the circuit interrupter as rapidly as possible.

The maximum charging time to power the GFCI is 2 milliseconds according to UL requirements. The RC circuit which determines the value of this time period in a circuit is the combination of a capacitor and resistor. For energy storage requirements, the capacitor should be 1uF. This dictates that the resistor be 2 Kohms. However, in order to reduce current level in the power circuit and prevent excess heat generation, the resistor should be on the order of 15 Kohms. It would be desirable to minimize excess heat generation while still providing a start up time less than 2 milliseconds.

FIG. 1 shows a commonly utilized, prior art supply for ground fault circuit interrupters. Line power at terminals 20, is drawn from the rectifier 24. Rectified power is drawn from the rectifier 24 at terminals 26,28 which provides a power source for a series resistance-capacitance circuit comprising 32 (of the order of 1 microfarad). At the voltage divider point 34, greater than 10 milliamps peak current is supplied to the V+ terminal of the ground fault detector integrated circuit 36. As one skilled in the art can appreciate the time constant of the RC circuit of the power supply affects how quickly the ground fault circuit interrupter can power up.

As one skilled in the art can also appreciate, in this prior art design, if the line voltage decreases below a requisite threshold, such as during a utility brownout or if one of the two line phases fails to deliver power, (which conditions are not uncommon), insufficient direct current will be supplied to the V+ terminal of the ground fault integrated circuit 36. Under such line voltage conditions, when insufficient power is supplied to integrated circuit 36 in this design, the ground fault circuit interrupter may not function properly.

The prior art GFCI's typically use an IC chip 36 or other circuit having a number of voltage reference devices such as Zener diodes connected in a string between the power supply input pin and ground. Such a device will absorb any amount of current in excess of the minimum and dump it to ground. Such an arrangement wastes energy which could actually be put to use to solve other problems in the prior art GFCI's, such as false tripping at AC zero crossings.

Although not required by the U.S. National Electrical Code, it would be desirable to provide a circuit interrupter which will allow continuing operation of a power circuit during reduced line voltage brownout conditions (below about 100 volts) and even when one of the line phases no longer feeds power to the circuit. It would also be desirable to provide a circuit interrupter with a power supply which enables the circuit interrupter to power up relatively quickly (i.e. less than about 2 milliseconds) and which has high line voltage withstand capability without increasing supply current to the ground fault integrated circuit.

SUMMARY OF INVENTION

It is an object of the present invention to provide a GFCI which is connected to both phases in an electrical distribution system, and which will operate when only one of the phases is energized.

It is an object of the present invention to provide a GFCI which can operate on relatively low input AC voltage, of about 50 volts, for example.

The ground fault circuit interrupter of the present invention has a power supply which powers up the ground fault integrated circuit in less than 2 milliseconds when fed by two phases. The power supply for the ground fault circuit interrupter of the present invention will provide a sufficient constant current to power the ground fault integrated circuit with as little as 50 volts AC line power in only one of the two phases. Thus, the GFCI of the present invention can actively protect a circuit under relatively low brownout line voltages, and can do so with only a single working phase.

The present invention provides a ground fault circuit interrupter, for attachment to a load counter and detecting a ground fault condition associated with a load in an electrical distribution system, and for disconnecting the load from the system in response thereto, comprising coupling circuit means connected to an electrical distribution system to provide a signal indicative of a ground fault imbalance in the system, a ground fault detector circuit connected to receive a ground fault imbalance signal, and operative in response to a power signal having specified voltage and current levels, said ground fault triggering circuit providing a ground fault trigger signal when the imbalance ,exceeds a certain level indicative of a ground fault in a load in the system, a regulated supply circuit connected to the electrical distribution system for generating and supplying to said ground fault interruption circuit a power signal having the specified voltage level at a regulated constant current level, and a power disconnector including circuit breaker contacts for disconnecting the load from the system in response to receipt of a ground fault trigger signal.

The power supply circuit preferably comprises a start up and storage portion, and a constant current portion. The start up and storage portion preferably comprises a transistor having its collector connected to receive a rectified pulse signal, and its base connected to a voltage reference source and first capacitor, and its emitter connected to a storage capacitor, to provide a charging path to charge the storage capacitor with a regulated voltage. A resistor is preferably connected between the transistor base and collector, to provide current flow to the voltage reference source and the capacitor, and to the base of the transistor. The voltage reference source may be a Zener diode. The start up and storage portion preferably comprises means for providing a low impedance charging path for a voltage current to the storage capacitor. The start up and storage portion also comprises a resistor which combined with said storage capacitor provides a time constant of about 2 milliseconds.

The power supply preferably comprises a constant current source regulator to provide a regulated constant current to the detector circuit. The constant current source may comprise a resistor, and means for providing a substantially constant voltage across the resistor, to thereby provide a substantially constant current through the resistor to the ground fault detector circuit.

The means for providing a substantially constant voltage across the resistor comprises a transistor having its base-emitter junction in parallel with the transistor. The transistor may be a pnp transistor operated forward biased to provide a substantially constant voltage across its base-emitter junction.

The ground default circuit detector may comprise means for detecting ground fault conditions in a two-phase electrical network, having a full-wave rectifier circuit connected to the electrical distribution system, for providing power to said power supply circuit, wherein the rectifier consists essentially of a first diode connected to one phase and a second diode connected to the other phase.

Other objects, advantages and features of the invention will be more readily understood when considering the following detailed description, claims and drawings.

DETAILED DESCRIPTION OF THE PREFERRED EMBODIMENT

Figure 1:
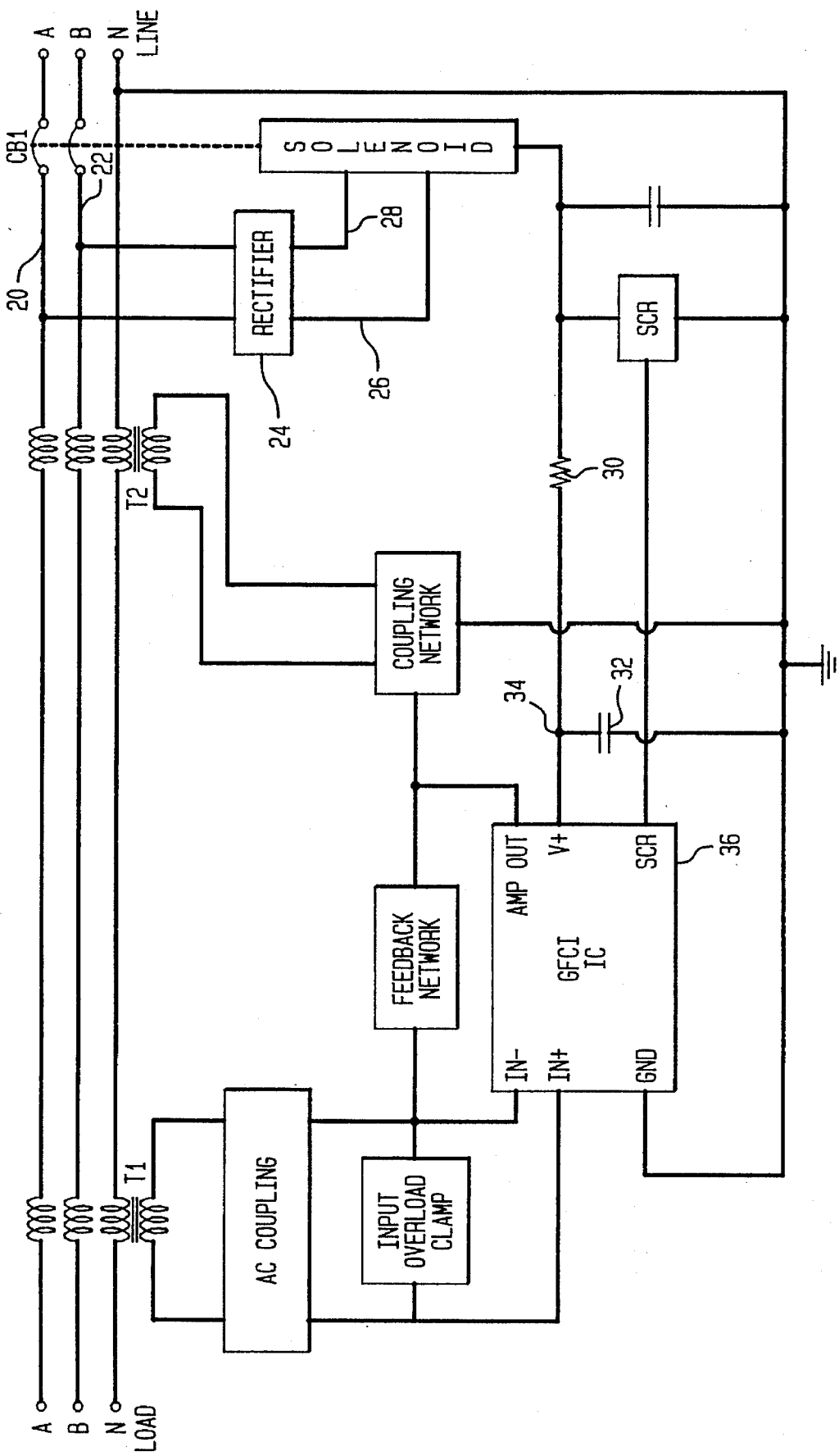
FIG. 1 is a block diagram of a conventional GFCI circuit according to the prior art.
Figure 2:
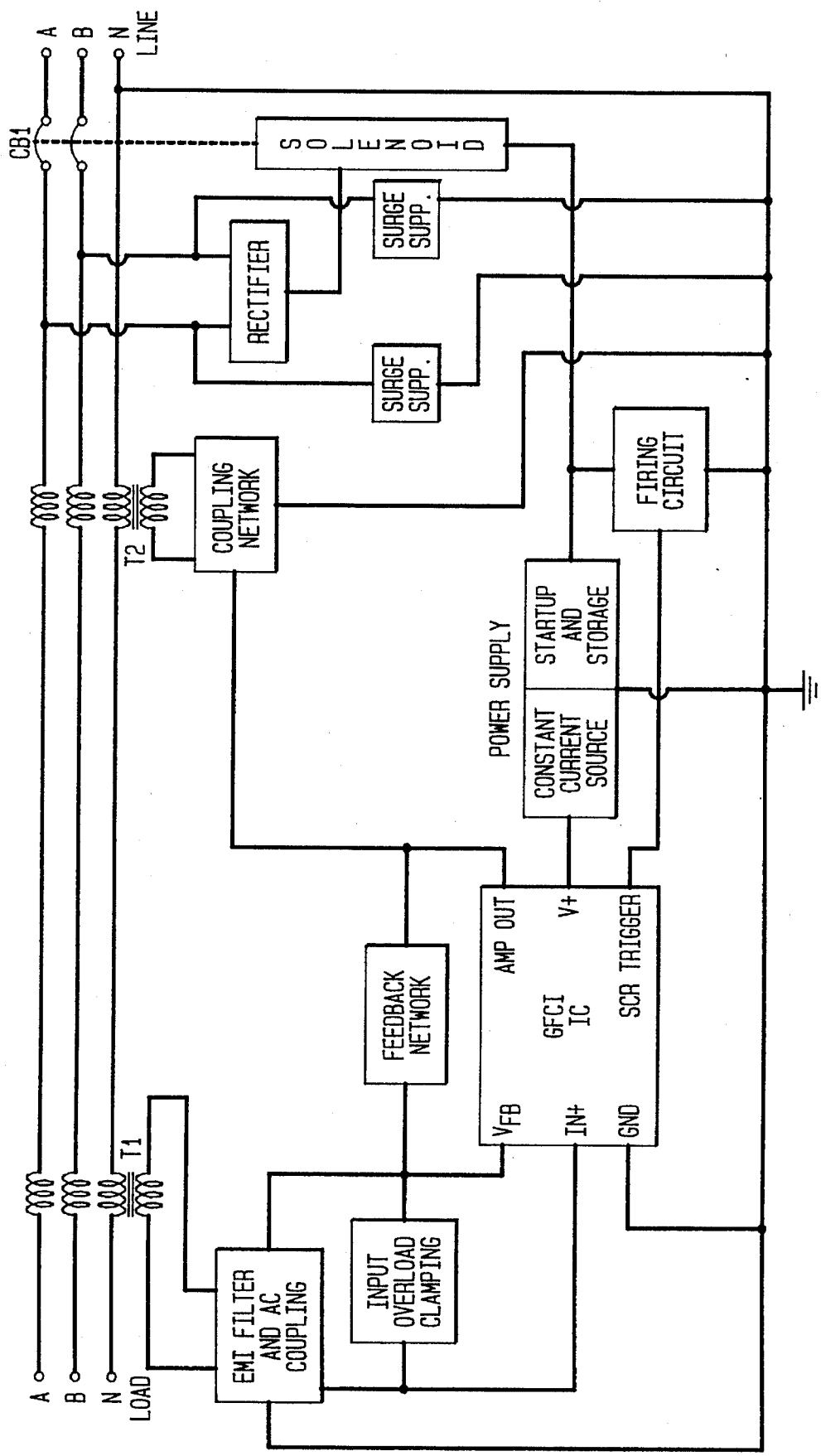
FIG. 2 is a block diagram of a GFCI circuit according to the present invention.
Figure 3:
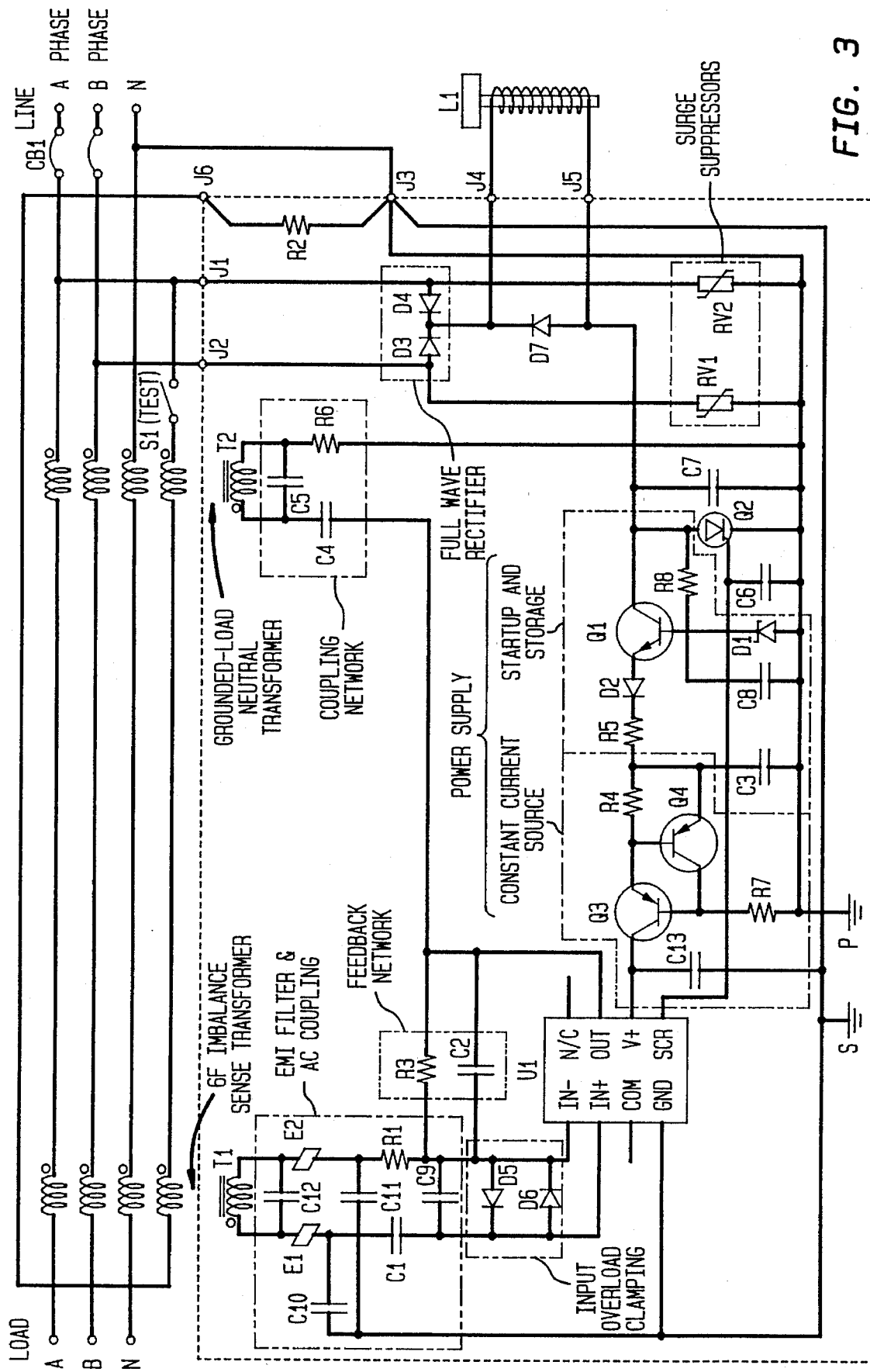
FIG. 3 is a schematic of a GFCI circuit according to the present invention.

Referring to FIG. 2, which shows a block diagram of a GFCI according to the invention, and FIG. 3 which shows a schematic of a GFCI according to the invention, an electrical distribution system represented on the top of the figure comprises a three wire two phase AC network, having lines A and B, each being 110 VAC relative to neutral N, and being 180° out of phase with each other, to also provide 220 VAC between lines A and B. The LINE connections are on the right and the LOAD connections are on the left. The connection between LINE and LOAD for each line A and B can be interrupted by relay contacts CB1, which are normally closed, but which can be opened by energizing a 120 V solenoid connected to connections J4 and J5 in the schematic with sufficient current.

A GFCI circuit is shown with substantially all its components (enclosed by the large dashed rectangle) mounted on a circuit board with connections J1–J6 along its edge. The GFCI circuit is connected to the electrical distribution system lines A and B at connections J1 and J2, respectively. A sense transformer T1, having a primary/secondary turns ratio of about 1:600, is connected to lines A, B, N and a test line to detect a ground fault imbalance. Another transformer T2, having a turns ratio of about 1:200 is similarly connected to the same lines to detect grounded-load neutral conditions.

The transformer T1 secondary leads are connected to a ground fault circuit interrupter integrated circuit chip U1, which may be a Raytheon model RV4145M chip, through an EMI filter and AC coupling circuit, and an input overload clamping circuit. The U1 chip has an internal operational amplifier (op amp), a comparison circuit and an output to fire an SCR. The transformer T2 secondary leads are also connected to the U1 chip through a coupling network of capacitors C4, C5 and resistor R6. Grounded neutral fault detection is accomplished when a short or fault closes a magnetic path between the sense transformer T1 and the grounded neutral transformer T2. The resultant AC coupling closes a positive feedback path (through a feedback circuit) around the op amp in the U1 chip, and the op amp then oscillates. When the peaks of the oscillation voltage exceed the SCR trigger comparator thresholds, the SCR output will go high to fire the SCR. When the SCR fires, a low impedance circuit is created across its anode and cathode terminals, resulting in an increase in current through the solenoid sufficient to drive its plunger to open the contacts CB1 in the lines A and B and disconnect the LOAD from the LINE.

The sensitivity to grounded neutral faults is adjusted by changing the frequency of oscillation. Increasing the frequency reduces the sensitivity by reducing the loop gain of the positive feedback circuit. As frequency increases, the signal becomes attenuated and the loop gain decreases. With typical values, the circuit will detect a grounded neutral having resistance of 2 ohms or less.

The U1 chip is supplied with a +24 volt supply at its $V_+$ input by a power supply circuit comprising a startup and storage portion and a constant current source portion. The power supply circuit is connected to the hot lines A and B at connections J1 and J2 respectively. A full wave rectifier comprising diodes D3 and D4 provides a rectified signal at connection point J4 of the solenoid L1. Each of diodes D3 and D4 contributes alternating pulses from the two respective phases. Specifically, diode D3 contributes positive pulses from phase B, discarding negative pulses, and diode D4 contributes positive pulses from phase A, discarding negative pulses. (See FIG. 4, top right). In the case where only one pulse is energized, alternating pulses will be missing (See FIG. 4, top left).

In its normal state, in the absence of ground or neutral faults, the solenoid is normally closed and the peak voltage at its upper terminal (relative to circuit ground) is about 170 volts, or 120 volts rms, and its impedance is about 30 ohms. The impedance of the solenoid is in series with the impedance of the remainder of the circuit. When the SCR is not conducting, the total circuit impedance seen by the 120 volt rms signal results in a current through the solenoid of about 5 milliamps, which is insufficient to trigger the solenoid. When the SCR fires, the impedance between the bottom of the solenoid (J5) and ground is relatively small because an essentially short circuit is created from node 1 through the SCR to ground. Except for a voltage drop of about 1 volt across the SCR, the entire 120 volts appears across the solenoid 30 ohm impedance, resulting in a current on the order of 3 or 4 amps which triggers the solenoid plunger and opens the contacts CBI to disconnect the LOAD from the LINE.

A diode D7 clamps the voltage when the solenoid triggers to prevent damage to the power supply and other circuitry. Surge suppressors RV1 and RV2 are also provided, which protect the circuit from voltage surges, clamping the voltage to ground under surge conditions.

Figure 4:
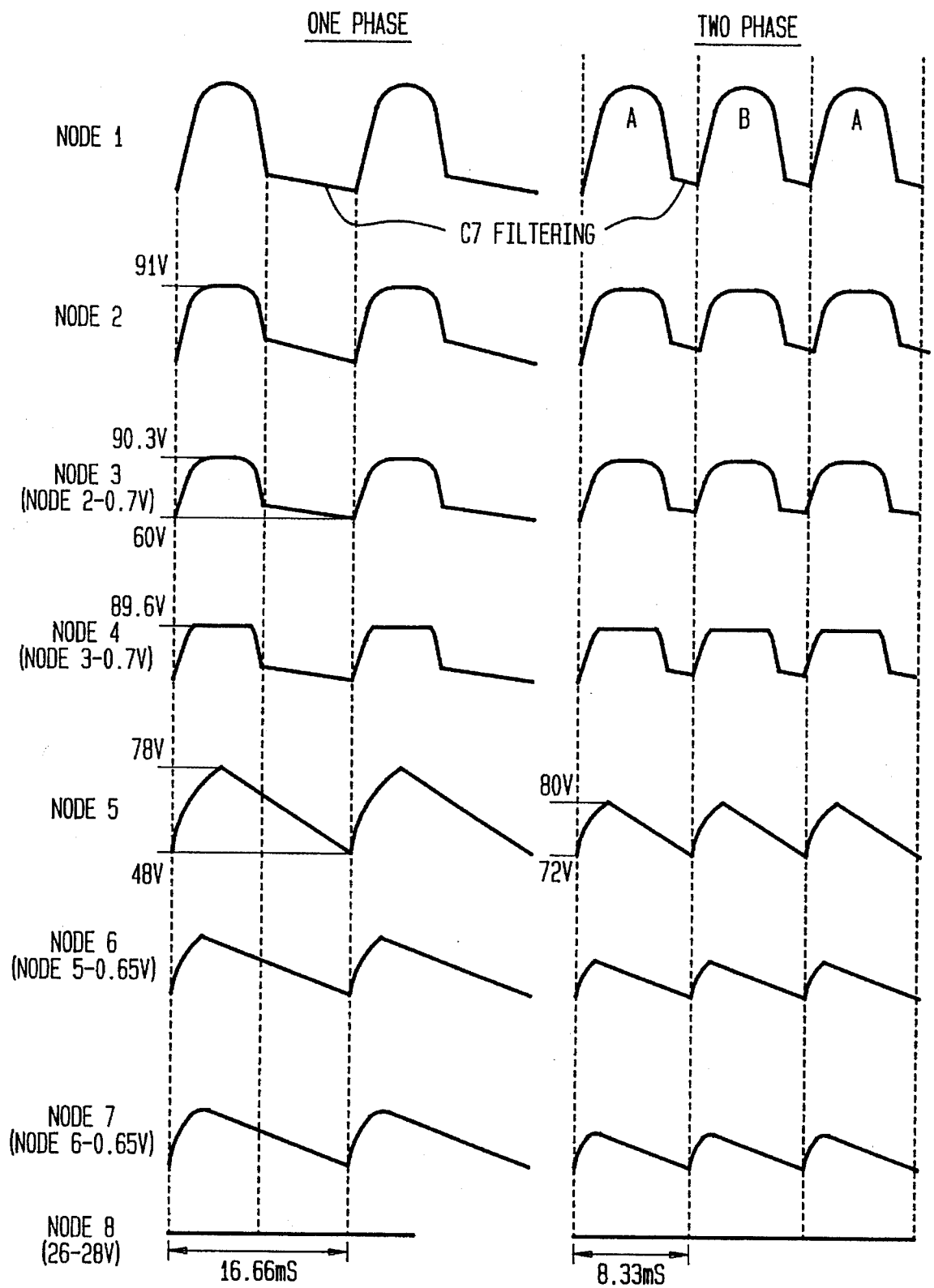
FIG. 4 is a drawing of waveforms at selected circuit nodes of the circuit of FIG. 3, for an aid in understanding the operation of the circuit.

Capacitor C7 filters noise off the line in cooperation with the solenoid winding as a two element LC filter. Capacitor C7 thus prevents accidental transient dV/dt triggering of the SCR. Capacitor C7 also functions to store energy and filters high frequency noise to keep the rest of the circuit working in close conjunction with the solenoid. Capacitor C7 stores charge between the peaks of the rectified pulses, smoothing out the rectified signal even when only one of the two line phases A or B is operative. As shown in FIG. 4, if only one of the two lines A and B are energized, the rectified signal appears to be a half rectified wave. If both lines A and B are energized, the rectified signal will appear to be a full rectified wave.

Capacitor C6 serves to protect the SCR trigger gate by (1) immunizing the gate from noise to minimize or eliminate any false triggering from narrow pulses, (2) protecting against fast transient current changes, and (3) providing a slight time delay to the gating of the SCR after a firing signal appears at the SCR output of the U1 chip, because the firing signal will first charge the capacitor C6, whose impedance is less then the impedance of the SCR gate when the SCR is off.

Capacitors C6 and C7 are dV/dt capacitors to prevent false triggering of the SCR due to fast voltage transients between the anode and gate of the SCR which have been known to cause false triggering at the SCR in prior art GFCI designs.

The Zener diode D1 provides a reference of 91 volts. the maximum Zener current is the maximum applied voltage (170 volts peak) at node 1 minus its breakdown voltage of 91 volts divided by the value of resistor R8 (56 k ohms), which is about 1.4 milliamps peak or about 1 milliamp rms. If the voltage at the Zener diode is less than or equal to 91 volts, the base-emitter voltage of transistor Q1 is about 0.7 volts, so the emitter voltage at node 3 is about 91–0.7 volts or about 90 volts. The maximum rating of $V_{CE}$ of Q1 is about 300 V, so the collector can go as high as about 390 V before breakdown. Over voltage conditions of lines A or B do not normally exceed 187 volts. Under normal quiescent operating conditions about 2–5 milliamps current is delivered to the collector of transistor Q1. Capacitor C8 is a filter capacitor to remove switching noise primarily attributable to Zener diode D1 from the base of transistor Q1.

Diode D2 prevents reverse leakage current through Q1 when the electrical system is operating only one of the A and B phases, (whereby current could leak between the rectified pulses), or when the SCR fires. If leakage occurred, capacitor C3 could become discharged, which is undesirable. Capacitor C3 is a reservoir of electrical charge for the current source portion of the power supply circuit. Capacitor C3 functions with resistor R5 to filter high frequency noise for transistor filtering. The voltage drop from node 4 to node 5 is about 10 volts due to the current value of about 5 millamps through resistor R5 having a value of about 2 k ohms.

The start-up and storage portion of the circuit serves to provide a low input impedance charging path through resistor R5 to charge capacitor C3 up to about 80 volts within 2 milliseconds. The circuit provides voltage regulation to capacitor C3 through the Zener diode D1. The Zener diode D1 clamps the voltage of the gate of transistor Q1 to the Zener diode breakdown voltage of 91 volts. Resistor R8 regulates current flow through Zener diode D1 and provides current to the base of transistor Q1. The maximum input voltage to resistor R8 is about 170 volts and its maximum output voltage is about 91 volts due to the clamping effect of the Zener diode D1.

The power supply includes a floating constant current portion comprising transistors Q3 and Q4 and resistors R4 and R7. Capacitor C13 connected to the output of this circuit is a filter capacitor, which functions to remove any remaining noise from the current source portion of the circuit to prevent inadvertent pulsation of the detector chip U1.

The constant current source is pseudo-voltage independent and maintains a constant current output of about 3.2 milliamps at the collector terminal of transistor Q3 regardless of the voltage between voltage divider R4 and R5. The current source acts like a shock absorber to absorb the excess voltage across the capacitor C3. Resistor R4 having a value of 200 ohms, in conjuction with transistor Q4, serves as a current regulator to set the amount of current into the emitter terminal of transistor Q3. Almost all of the current through resistor R4 also goes through the Q3 emitter/collector path due to the relatively high impedance of the base of transistor Q4. The voltage drop $V_{BE}$ of transistor Q4 is about 0.65 V, which is the reference voltage for this portion of the circuit. This clamps the voltage across resistor R4 to about 0.65 V, which in turn regulates the current to 0.65 V/200 ohms or about 3.2 milliamps through R4, through the emitter-collector path of transistor Q3 and to the V+ terminal of the U1 chip. This current is regulated at 3.2 milliamps regardless of the voltage at the voltage divider point node 5 between resistors R4 and R5. Being substantially voltage independent (or pseudo-voltage independent) the constant current source with its storage capacitor C3 can ride through AC zero crossings and also work at low line voltages of about 55–60 volts.

Resistor R7 keeps the current flow out of the Q4 collector low enough so as not to burn out transistor Q4, also keeping the current flow through the base of transistor Q4 sufficiently low, so as not to add much current to resistor R4 current output. Resistor R7 therefore functions to bias transistors Q3 and Q4 to active regions of operation. Capacitor C13 is connected to node 8, which is at the collector of transistor Q3 and the input V+ of the detector U1 chip. Capacitor C13 functions to filter the output of the constant current power supply portion, which is a substantially constant 3.2 milliamp current supply at about 26 to 28 volts dc relative to ground.

The EMI filter and AC coupling circuit is connected between the sense transformer T1 and detector chip U1 and comprises a number of filter elements which together attenuate both common mode and differential-mode signals. The first element of the filter circuit comprises capacitor C12. This capacitor attenuates differential-mode EMI/RFI by shorting out high-frequency components of the incurring signal that are coupled into the transformer T1 secondary.

The second element of the filter circuit comprises inductors E1 and E2, which attenuate common-mode and differential-mode EMI/RFI by blocking high-frequency components from passing through them. Inductors E1 and E2 may be Fair-rite 2761015112 ferrite beads.

The third element of the filter comprises capacitors C10 and C11, which attenuate common-mode EMI/RFI components by shorting high-frequency components to circuit common, which is tied to earth ground. They also combine in series to act as one differential-mode capacitor having half the value of either individual capacitor. These three filter elements comprising components C12, E1, E2, C10 and C11 comprise a third-order low pass filter having an attenuation slope or roll-off of −18 dB/octave, which is −6 dB/octave for each of the three lumped filter elements.

Capacitor C9 functions as an auxiliary filter by coupling with resistor R1 to form an additional low-pass filter section or element. This section attenuates any differential-mode EMI/RFI that has passed through the preceding filter elements or sections. The capacitor C9 prevents this energy from being coupled into either D5 or D6, or into the transistor junctions in the first stage amplifier circuit of the detector chip U1.

Diodes D5 and D6 comprise an input overload clamping circuit, to clamp the signals inputed to the detector chip U1.

The filter design according to the present invention takes into account the non-ideal behavior of the filter elements, and their ultimate effect on the behavior of the filter to attenuate the EMI/RFI frequencies of interest in the stop band. For example, inductors have an impedance which rises with increased frequency, for lower frequency ranges. Above this range, parasitic capacitance of the physical inductor construction tends to alter the ideal impedance/ frequency curve, making it actually fall with frequency above the frequency corresponding to the maximum impedance. The objective is to provide the maximum impedance of the device at the frequency band of interest, to filter or attenuate this undesired noise. The same principles apply to capacitors, which although their basic impedance falls with increasing frequency, their parasitic inductance influences the impedance curve to create a minimum magnitude of impedance at a certain resonant frequency characteristic of the device.

The net result of these non-ideal characteristics of inductors and capacitors is to end up with a band reject filter at the EMI/RFI frequencies of interest, instead of an ideal low-pass filter. Low frequencies and high frequencies pass through the filter unattenuated, whereas the frequency range of the EMI/RFI signals which cause the greatest perturbation in the GFCI's operation is rejected by the filter. It is preferred to also consider the parasitic inductances and capacitances that exist as functions of the printed circuit board (PCB) geometry and fabrication, and their respective influences on the behavior of the inductor and capacitor lumped elements.

The topology of the filter is a "pi" network which is functionally compatible with the current source output of sense transformer C1. The pi-network topology comprises a shunt element first, followed by a series element, followed by another shunt element. The filter according to the invention provides a multi-element network specifically tuned to prevent RFI energy from entering the input of the detector chip U1. The topology removes both common-mode and differential-mode spurious components from the signal received from the sense transformer T1 secondary. The pi topology gives maximum attenuation of RFI energy that is injected from the current-source output of the sense transformer T1. The filter's circuit common is directly tied to earth ground.

The grounding system of the present GFCI circuit is a "star" ground, whereby all points connected to a circuit common ultimately converge at one central grounding point. The signal grounding point arrangement is superior to multiple ground arrangements because the circuit occupies a relatively small area compared to one wavelength of the imposing EMI/RFI noise.

The circuit layout includes separate ground planes for signal and power supply circuitry, preventing any energy that is being decoupled to ground from the power supply from influencing the operation of the small signal circuits and vice versa. Primarily, this avoids the particular problem in which the ground pin of the U1 IC chip (which contains a high-gain op-amp) sees a floating potential as a result of RF energy passing through its grounding system from the power supply.

The present circuit also employs ground guarding, whereby all available PCB areas not occupied by signal or power traces are filled in with the ground plane. This provides the lowest impedance path to ground attainable to remove conducted RF energy from the circuit. The large copper areas also act as a shield to couple radiated RF energy directly to ground and away from the circuit elements.

The present circuit arrangement also provides a direct, low-impedance connection to earth ground. The circuit common in the GFCI is connected to the neutral bus in the service equipment, which is connected directly to the earth ground. Thus, all RF energy that is decoupled from the circuit has a direct, continuous, low-impedance path to earth ground. This arrangement is provided by the use of diodes D3 and D4 as a two-element, full wave rectifier to convert the 120/240 volt line power to a 120 volt RMS pulsating DC supply, which looks like a full wave rectification of a single phase 120 volt line. This avoids the use of a full wave bridge rectifier using four diodes according to some prior art GFCI circuits. In full wave four diode bridge circuits, a diode is always in a circuit path between circuit common and the line connections in the load center. Diodes are particularly poor conductors of RF because they tend to modulate and rectify RF signals. The present arrangement using two diodes whereby all RF energy that is decoupled from the circuit has a direct, continuous, low-impedance path to earth ground to minimize RF noise disturbing the GFCI operation.

Although a preferred embodiment of the invention has been shown and described, the present invention is not limited to the preferred embodiment. Numerous variations and modifications to the preferred embodiment will occur to those skilled in the art without departing from the spirit and scope of the invention which is set forth in the appended claims.

What is claimed is:

1. A ground fault circuit interrupter, for attachment to a load and detecting a ground fault condition associated with a load in an electrical distribution system, and for disconnecting the load from the system in response thereto, comprising:

coupling circuit means connected to an electrical distribution system to provide a signal indicative of a ground fault imbalance in the system;

a ground fault detector circuit connected to receive a ground fault imbalance signal, and operative in response to a power signal having specified voltage and current levels, said ground fault triggering circuit providing a ground fault trigger signal when the imbalance exceeds a certain level indicative of a ground fault in a load in the system;

a regulated power supply circuit connected to the electrical distribution system for generating and supplying to said ground fault interruption circuit a power signal having the specified voltage level at a regulated constant current level; and a power disconnector including circuit breaker contacts for disconnecting the load from the system in response to receipt of a ground fault trigger signal;

wherein the power supply circuit comprises a start up and storage portion, and a constant current supply portion; and wherein the start up and storage portion comprises a transistor having its collector connected to receive a rectified pulse signal, its base connected to a voltage reference source and first capacitor, and its emitter connected to a storage capacitor, to provide a charging path to charge the storage capacitor with a regulated voltage.

2. The ground fault interruption circuit according to claim 1, wherein the startup and storage portion further includes a resistor connected between the transistor gate and collector, to provide limited current flow to the voltage reference source and the first capacitor, and to the base of the transistor.

3. A ground fault circuit interrupter, for attachment to a load and detecting a ground fault condition associated with a load in an electrical distribution system, and for disconnecting the load from the system in response thereto, comprising:

coupling circuit means connected to an electrical distribution system to provide a signal indicative of a ground fault imbalance in the system;

a ground fault detector circuit connected to receive a ground fault imbalance signal, and operative in response to a power signal having specified voltage and current levels, said ground fault triggering circuit providing a ground fault trigger signal when the imbalance exceeds a certain level indicative of a ground fault in a load in the system;

a regulated power supply circuit connected to the electrical distribution system for generating and supplying to said ground fault interruption circuit a power signal having the specified voltage level at a regulated constant current level;

a power disconnector including circuit breaker contacts for disconnecting the load from the system in response to receipt of a ground fault trigger signal; and a Zener diode as a current reference source.

4. A ground fault circuit interrupter, for attachment to a load and detecting a ground fault condition associated with a load in an electrical distribution system, and for disconnecting the load from the system in response thereto comprising:

coupling circuit means connected to an electrical distribution system to provide a signal indicative of a ground fault imbalance in the system;

a ground fault detector circuit connected to receive a ground fault imbalance signal, and operative in response to a power signal having specified voltage and current levels, said ground fault triggering circuit providing a ground fault trigger signal when the imbalance exceeds a certain level indicative of a ground fault in a load in the system;

a regulated power supply circuit connected to the electrical distribution system for generating and supplying to said ground fault interruption circuit a power signal having the specified voltage level at a regulated constant current level; and a power disconnector including circuit breaker contacts for disconnecting the load from the system in response to receipt of a ground fault trigger signal;

wherein the power supply circuit comprises a start up and storage portion, and a constant current supply portion; and wherein the start up and storage portion comprises a storage capacitor and means for providing a low impedance charging path for a current signal to said storage capacitor.

5. The ground fault interruption circuit according to claim 4, wherein the start up and storage portion comprises a resistor which combined with said storage capacitor provides a time constant of about 2 milliseconds.

6. A ground fault interruption circuit, for detecting a ground fault condition associated with a load in an electrical distribution system, and for disconnecting the load from the system in response thereto, comprising:

coupling circuit means connected to an electrical distribution system to provide a signal indicative of a ground fault imbalance in the system;

a ground fault detector circuit connected to receive a ground fault imbalance signal, and operative in response to a power signal having specified voltage and current levels, said ground fault triggering circuit providing a ground fault trigger signal when the imbalance exceeds a certain level indicative of a ground fault in a load in the system;

a regulated power supply circuit connected to the electrical distribution system for generating and supplying to said ground fault interruption circuit a power signal having the specified voltage level at a regulated constant current level, said power supply circuit comprising:

a start up and storage portion comprising a first transistor having its collector connected to receive a rectified pulse signal, its base connected to a voltage reference source and first capacitor, and its emitter connected to a storage capacitor, to provide a low impedance charging path to charge the storage capacitor to a regulated voltage; and a constant current supply portion comprising a resistor, a second transistor having its base emitter junction in parallel with the second transistor to provide a substantially constant current through the resistor and a regulated constant current to the detector circuit; and power disconnect means for disconnecting the load from the system in response to receipt of a ground fault trigger signal.

7. The ground fault interruption circuit according to claim 6, wherein the startup and storage portion further includes a resistor connected between the first transistor gate and collector, to provide regulated current flow to the voltage reference source and the first capacitor, and to the base of the first transistor.

8. The ground fault interruption circuit according to claim 6, wherein the voltage reference source is a Zener diode.

9. The ground fault interruption circuit according to claim 6, wherein the second transistor is a pnp transistor operated forward biased to provide a substantially constant voltage across its base-emitter junction.

10. The ground fault interruption circuit according to claim 6, wherein the ground fault detector circuit comprises means for detecting ground fault conditions in a two-phase electrical network.

11. The ground fault interruption circuit according to claim 6, further comprising a full-wave rectifier circuit connected to the electrical distribution system, for providing power to said power supply circuit.

12. The ground fault interruption circuit according to claim 11, wherein the electrical distribution system is a two-phase network, and wherein the rectifier is connected to both phases, said rectifier consisting essentially of a first diode connected to one phase and a second diode connected to the other phase.

13. The ground fault interruption circuit according to claim 6, wherein the detector circuit comprises an IC chip.

* * * * *